US011388203B2

(12) United States Patent
Whynot et al.

(10) Patent No.: US 11,388,203 B2
(45) Date of Patent: Jul. 12, 2022

(54) SYSTEMS AND METHODS FOR MEDIA TUNNELING THROUGH EDGE SERVER

(71) Applicant: Avaya Inc., Santa Clara, CA (US)

(72) Inventors: Stephen Whynot, Allen, TX (US); Mehmet Balasaygun, Freehold, NJ (US); Manish Chatterjee, Calcutta (IN)

(73) Assignee: Avaya Inc., Santa Clara, CA (US)

( * ) Notice: Subject to any disclaimer, the term of this patent is extended or adjusted under 35 U.S.C. 154(b) by 88 days.

(21) Appl. No.: 15/335,735

(22) Filed: Oct. 27, 2016

(65) Prior Publication Data

US 2018/0054468 A1 Feb. 22, 2018

Related U.S. Application Data

(60) Provisional application No. 62/375,680, filed on Aug. 16, 2016.

(51) Int. Cl.
*G06F 15/16* (2006.01)
*H04L 65/1069* (2022.01)
(Continued)

(52) U.S. Cl.
CPC ...... *H04L 65/1069* (2013.01); *H04L 12/4633* (2013.01); *H04L 65/105* (2013.01); *H04L 65/1006* (2013.01); *H04L 67/02* (2013.01)

(58) Field of Classification Search
CPC .............. H04L 65/1069; H04L 65/1006; H04L 65/105; H04L 12/4633; H04L 67/02;
(Continued)

(56) References Cited

U.S. PATENT DOCUMENTS 7,483,437 B1 * 1/2009 Mohaban .............. H04L 63/029
370/400
8,266,299 B2 * 9/2012 Zetterlund .......... H04L 41/0806
709/227

(Continued)

OTHER PUBLICATIONS

Official Action for U.S. Appl. No. 16/039,585, dated Nov. 18, 2019 32 pages.

(Continued)

*Primary Examiner* — Johnny B Aguiar
(74) *Attorney, Agent, or Firm* — Sheridan Ross P.C.

(57) ABSTRACT

Embodiments provide systems and methods for exchanging media through an edge server between different communication networks. More specifically, embodiments of the present disclosure provide systems and methods for establishing and conducting voice and/or video communications between one or more parties on a private network, such as within an enterprise, and one or more parties on a different network such as another private network or an open network such as the Internet using an edge server of the enterprise network. This edge server, also referred to herein as a Session Border Controller (SBC), can be adapted to allow media packets to traverse through a port typically kept open by enterprise firewalls and used for other data exchanges such as HyperText Transfer Protocol (HTTP) data traffic. The SBC can also provide multiplexing and demultiplexing of media streams through the same port and address to traverse firewalls between the different communication networks.

13 Claims, 5 Drawing Sheets

(51) Int. Cl.
   *H04L 65/10* (2022.01)
   *H04L 67/02* (2022.01)
   *H04L 12/46* (2006.01)
   *H04L 65/1045* (2022.01)

(58) Field of Classification Search
   CPC ......... H04L 29/06197; H04L 29/06278; H04L 29/06326; H04L 43/0811; H04L 65/102
   USPC ........................................ 709/219, 227, 246
   See application file for complete search history.

(56) References Cited

U.S. PATENT DOCUMENTS

| | | | |
|---|---|---|---|
| 9,479,967 B1* | 10/2016 | Smith | H04W 88/181 |
| 10,880,120 B2 | 12/2020 | Chatterjee et al. | |
| 2002/0122416 A1 | 9/2002 | Xu et al. | |
| 2006/0080407 A1* | 4/2006 | Rengaraju | H04L 65/4061 |
| | | | 709/219 |
| 2008/0192108 A1* | 8/2008 | Pelous | H04W 76/10 |
| | | | 348/14.01 |
| 2008/0267096 A1 | 10/2008 | Nakamura et al. | |
| 2009/0238168 A1* | 9/2009 | Lavoie | H04L 65/1046 |
| | | | 370/352 |
| 2010/0325300 A1* | 12/2010 | Vasters | H04L 63/029 |
| | | | 709/231 |
| 2012/0120852 A1* | 5/2012 | Morken | H04M 3/428 |
| | | | 370/259 |
| 2012/0243549 A1* | 9/2012 | Lyons | H04L 65/1069 |
| | | | 370/410 |
| 2013/0067020 A1 | 3/2013 | German et al. | |
| 2013/0138822 A1 | 5/2013 | Hu et al. | |
| 2014/0226664 A1 | 8/2014 | Chen et al. | |
| 2015/0188882 A1* | 7/2015 | Wang | H04L 65/1069 |
| | | | 370/352 |
| 2016/0380967 A1 | 12/2016 | Moore et al. | |
| 2017/0180484 A1* | 6/2017 | Asveren | H04L 67/141 |
| 2017/0339565 A1* | 11/2017 | Dong | H04L 65/1069 |

OTHER PUBLICATIONS

Official Action for U.S. Appl. No. 16/039,585, dated May 6, 2020 28 pages.
Notice of Allowance for U.S. Appl. No. 16/039,585, dated Aug. 17, 2020 15 pages.

* cited by examiner

SYSTEMS AND METHODS FOR MEDIA TUNNELING THROUGH EDGE SERVER

CROSS REFERENCE TO RELATED APPLICATION

The present application claims the benefits of and priority, under 35 U.S.C. § 119(e), to U.S. Provisional Application No. 62/375,680 filed Aug. 16, 2016 by Whynot, et al. and entitled "Systems and Methods for Media Tunneling Through Edge Server" of which the entire disclosure is incorporated herein by reference for all purposes.

FIELD OF THE DISCLOSURE

Embodiments of the present disclosure relate generally to methods and systems for exchanging media across communication networks and more particularly to exchanging media through an edge server between communication networks.

BACKGROUND

Exchanges of audio and/or video media may occur in various types of communication sessions such as voice calls, video calls, voice and/or video conferences, etc. These exchanges can also be made across different types of networks. For example, a voice or video call or conference can be established and conducted on a closed network, such as within a private network of an enterprise, on an open or public network, such as the Internet, or on a combination of these networks, such as when a party to the call or conference is on a private, enterprise network and another party in on the Internet or a different private network. Typically, voice or video calls or conferences on either an open, public network or on a private network can be established and conducted using known protocols such as User Datagram Protocol (UDP) or Web Real Time Communication (WebRTC) protocol without concern about crossing boundaries between the private network and the open network. However, when a call or conference is to be established and conducted across both open and private networks or across different private networks, security policies may be in place on the private network(s) that prohibit certain types of traffic from crossing the boundary between these networks. For example, a Session Initiation Protocol (SIP) or HyperText Transport Protocol (HTTP) client may try to initiate a call or conference with another party on an enterprise network different from the private or public network of the client. Such a call or conference will traverse one or more firewalls of the enterprise. However, the enterprise may implement security policies that prohibit UDP, WebRTC, or other media protocol packets from crossing this firewall causing the call or conference to fail.

BRIEF SUMMARY

Embodiments of the disclosure provide systems and methods for exchanging media through an edge server between different communication networks. More specifically, embodiments of the present disclosure provide systems and methods for establishing and conducting voice and/or video communications between one or more parties on a private network, such as within an enterprise, and one or more parties on a different network such as another private network or an open network such as the Internet using an edge server of the enterprise network. This edge server, also referred to herein as a Session Border Controller (SBC), can be adapted to allow media packets to traverse through a port typically kept open by enterprise firewalls and used for other data exchanges such as HyperText Transfer Protocol (HTTP) data traffic. The SBC can also provide multiplexing and demultiplexing of media streams through the same port and address to traverse firewalls between the different communication networks.

Figure 1:
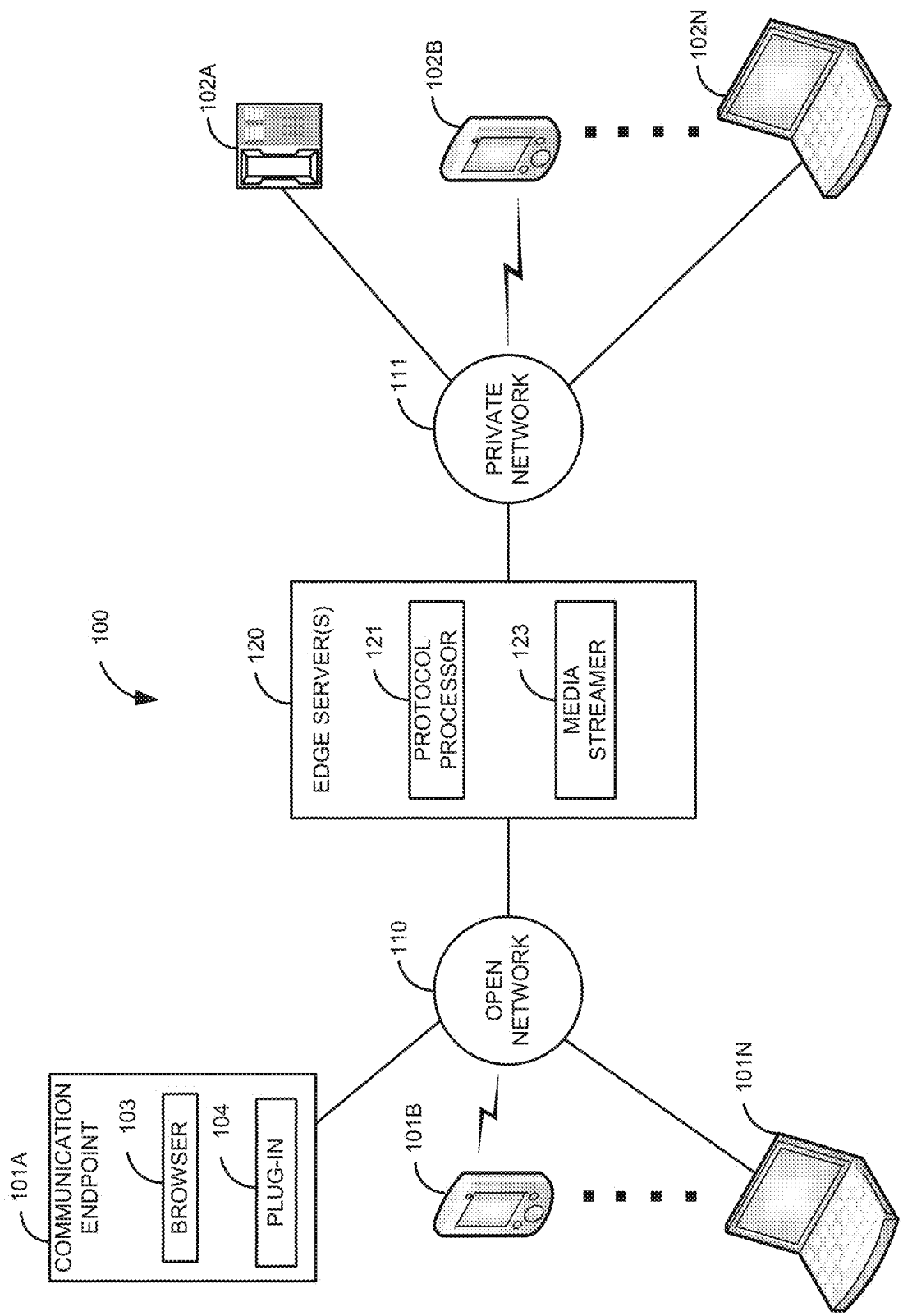
FIG. 1 is a block diagram illustrating a system for exchanging media across communication networks according to one embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosure herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for exchanging media through an edge server between different communication networks. More specifically, embodiments of the present disclosure provide systems and methods for establishing and conducting voice and/or video communications between one or more parties on a private network, such as within an enterprise, and one or more parties on a different network such as another private network or an open network such as the Internet using an edge server of the enterprise network. This edge server, also referred to herein as a Session Border Controller (SBC), can be adapted to allow media packets to traverse through a port typically kept open by enterprise firewalls and used for other data exchanges such as HyperText Transfer Protocol (HTTP) data traffic. The SBC can also provide multiplexing and demultiplexing of media streams through the same port and address to traverse firewalls between the different communication networks.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating a system for exchanging media across communication networks according to one embodiment. As illustrated in this example, the system 100 can comprises communication endpoints 101A-101N on an open network 110 such as the Internet and communication endpoints 102A-102N on a private network 111 such as an enterprise network. One or more edge servers 120 can be communicatively coupled with both the open network 110 and private network 111.

The communication endpoints 101A-101N on the open network 110 can be or may include any communication endpoint that can communicate on the open network 110, such as a Personal Computer (PC), a telephone, a video system, a cellular telephone, a Personal Digital Assistant (PDA), a tablet device, a notebook device, a smart phone, and/or the like. As shown in FIG. 1, any number of communication endpoints 101A-101N may be connected to the open network 110, including only a single communication endpoint.

The communication endpoints 101A-101N may, in some cases, further comprise a browser 103. The browser 103 can be or may include any software that can browse the network 110, such as Firefox®, Internet Explorer®, Google Chrome®, Opera®, Safari®, and/or the like. The browser 103 may communicate on the open network 110 using protocols, such as HTTP and WebRTC.

One or more communication endpoints, such as endpoint 101A, can further comprise a browser plug-in 104. The browser plug-in 104 can be any browser plug-in that can provide additional features to the browser 103. Although the communication endpoints 101B-101N do not show the browser 103 or browser plug-in 104, some or all of these communication endpoints 101B-101N may also have the browser 103 and browser plug-in 104 as appropriate.

The communication endpoints 102A-102N on the private network 111 can be or may include any communication endpoint that can communicate on the private network 111, such as a Personal Computer (PC), a telephone, a video system, a cellular telephone, a Personal Digital Assistant (PDA), a tablet device, a notebook device, a smart phone, and/or the like. As shown in FIG. 1, any number of communication endpoints 102A-102N may be connected to the network 111, including only a single communication endpoint 102. While not shown here, it should be understood that endpoints 102A-102N may also comprise a browser and browser plug-in as appropriate.

The networks 110 and 111 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110 and 111 can use a variety of protocols, such as Ethernet, Internet Protocol (IP), Session Initiation Protocol (SIP), Integrated Services Digital Network (ISDN), HTTP, WebRTC, JSON-RPC, and the like. In one embodiment, the open network 110 may be the Internet and the private network 111 may be a corporate or enterprise network.

The edge servers 120 can be or may include any hardware/software that can manage protocol conversion between the open network 110 and the private network 111. Generally speaking, the one or more edge servers 120 can further comprise a protocol processor 121 and/or a media streamer 123. The protocol processor 121 can be or may include any hardware/software that can process protocols, such as, WebRTC, JSON-RPC, SIP, BFCP, and/or the like. The media streamer 123 can be or may include any hardware/software that can be used to stream media in a conference call. The media streamer 123 can be controlled by a specific participant in the conference call. The media streamer 123 can be used to determine who can receive the media stream.

As noted above, embodiments of the disclosure provide systems and methods for exchanging media through the one or more edge server(s) 120 between the open network 110 and private network 111. More specifically, embodiments of the present disclosure provide systems and methods for establishing and conducting voice and/or video communications between one or endpoints 102A-102N on the private network and one or more endpoints 101A-101N on the open network 110 or on a different enterprise network (not shown here). Two external endpoints may use media tunneling techniques described herein and supported by the edge server(s) 120 to set up a successful call/media path. In this case, the edge server(s) 120 can be viewed as hair pinning the media path between two endpoints that cannot directly exchange media traffic. As will be described in greater detail below, the edge server(s) 120 can be adapted to allow media packets to traverse through a port typically kept open by enterprise firewalls and used for other data exchanges such as HyperText Transfer Protocol (HTTP) data traffic.

Figure 2:
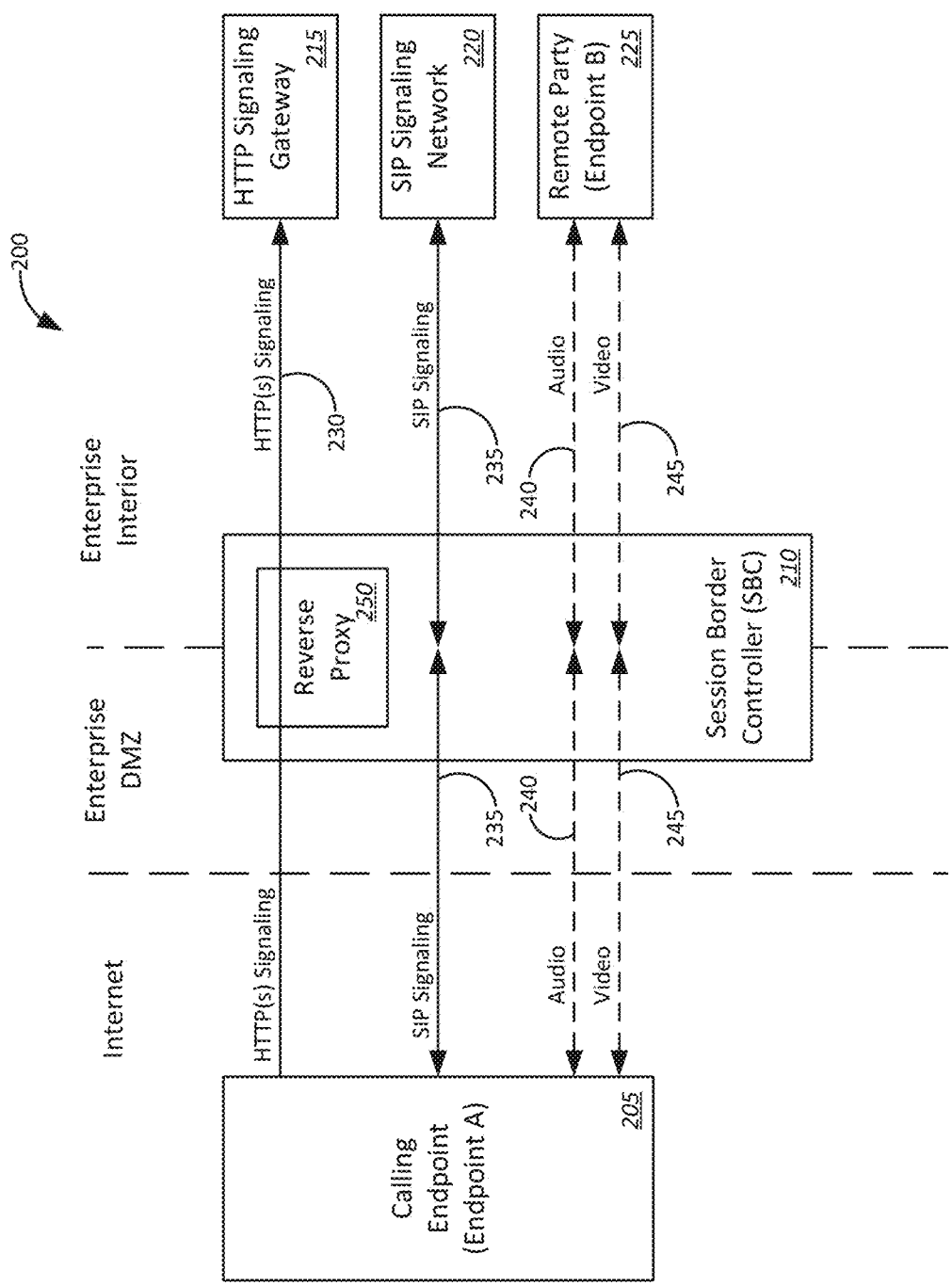
FIG. 2 is a block diagram illustrating additional details of a system for media tunneling through an edge server and exchanging media across communication networks according to one embodiment.

FIG. 2 is a block diagram illustrating additional details of a system for media tunneling through an edge server and exchanging media across communication networks according to one embodiment. As illustrated in this example, the system 200 can comprise a calling endpoint, such as any of the endpoints 101A-101N described above. The calling endpoint can be communicatively coupled via the Internet or other open network (not shown here) such as described above with a Session Border Controller (SBC) 210 such as one or more of the edge servers also as described above. The SBC 210 can also be communicatively coupled with a private network (not shown here) such as an enterprise network as described above. Through the private network, the SBC can communicate with a HyperText Transfer Protocol (HTTP) signaling gateway 215, a Session Initiation Protocol (SIP) signaling network, and a remote endpoint 225 such as any of the endpoints 102A-102N described above.

Generally speaking, embodiments of the present disclosure provide systems and methods for establishing and conducting voice and/or video communications between the calling endpoint 205 and the remote endpoint 225. For example, the calling endpoint 205 may call or otherwise attempt to contact the remote endpoint to establish a voice call, video call, voice and/or video conference, or other communication session in which audio and/or video media will be exchanged. As will be described in greater detail below, the SBC 210 can be adapted to allow media packets, i.e., the audio and/or video streams of the session, to traverse through a port typically kept open by enterprise firewalls and used for other data exchanges such as HyperText Transfer Protocol (HTTP) data traffic.

More specifically, exchanging media between the calling endpoint 205 and the remote endpoint 225 can begin with the calling endpoint 205 sending a message requesting call initiation. For example, the external, calling endpoint 205 can send a signaling message requesting call setup such as a SIP INVITE message via a SIP signaling channel 235 to the SIP signaling network 220 or an HTTP-based message via an HTTP signaling channel to the HTTP signaling gateway. The call setup signaling can include the calling endpoint's 205 media capabilities captured in a Session Description Protocol (SDP) message carried in the call set up message (e.g., in the SIP INVITE request). According to one embodiment, the SDP message can include the calling endpoint's 205 local IP address, list of codecs the calling endpoint 205 prefers to use for an audio channel 240 and video channel 245, audio and video port numbers that are used to send/receive audio and video RTP packets/respectively.

The SBC 210 can receive, from the calling endpoint 205, the message requesting initiation of the call between the calling endpoint 205 and the remote endpoint 225 and determining whether the call has been accepted by the remote endpoint 225. If the call set up request is not accepted by the remote endpoint 225, the call can fail. In response to determining the call has been accepted by the remote endpoint 225, the SBC 210 can send a response to the calling endpoint 205 indicating acceptance of the call. For example, if the call set up request is accepted by the remote endpoint 225, a SIP 200 OK response via the SIP signaling channel 235 (or an HTTP message via the HTTP signaling channel 230) carrying the remote endpoint's 225 SDP media capabilities can be returned to the calling endpoint 205 from the SBC 210. This information returned to the calling endpoint 205 can include the remote endpoint's 225 media address, ports (audio and video), audio and video codecs, etc.

The calling endpoint 205 can receive the response from the SBC 210 and, still during initiation of the call session with the remote endpoint 225, send a message to the remote endpoint 225 to check media connectivity in the call session. For example, the calling endpoint 205 can send a STUN message over audio channel 240 or video channel 245, to make sure that UDP based RTP audio and video packets can be exchanged with the remote endpoint 225. According to one embodiment, UDP-based media exchange can be considered the default way of exchanging media over TLS-based media exchange and TLS-based media exchange can be used when UDP based media is unavailable or not supported due to firewall or other restrictions imposed between the calling endpoint 205 and the remote endpoint 225.

The SBC 210 can receive the message to check media connectivity in the call session from the calling endpoint 205 and determine, based on the message from the calling endpoint 205, whether media connectivity is available between the calling endpoint 205 and the remote endpoint 225. In response to determining media connectivity is available between the calling endpoint 205 and the remote endpoint 225, the endpoints 205 and 225 and SBC 210 can conduct the call session between the calling endpoint 205 and the remote endpoint 225 using the signaling channel 230 or 235 without media tunneling. For example, if the STUN connectivity check passes, then the audio and video packets can be carried over UDP and no TLS based media tunneling is done. In response to determining media connectivity is not available between the calling endpoint 205 and the remote endpoint 225, the endpoints 205 and 225 and SBC 210 can conduct the call session between the calling endpoint 205 and the remote endpoint 210 using the signaling channel 230 and 235 and media tunneling. For example, if the STUN connectivity check fails, the calling endpoint 205 can initiate a media tunneling based negotiation.

Media tunneling can begin with the calling endpoint 205 generating a media tunneling offer. According to one embodiment, media tunneling can use a separate TCP/TLS connection on port 443 to utilize firewall pinholes opened for HTTP traffic instead of tunneling media over an HTTP session or a web socket session. Thus, the calling endpoint 205 can initiate a new SDP offer with TCP/TLS RTP transport on each media channel 240 and 245 instead of UDP RTP. According to one embodiment, the media tunneling offer can comprise a representation of a certificate for the calling endpoint. For example, the SDP offer can contain a fingerprint of a self-signed certificate locally generated by the calling endpoint 205. The locally generated certificate can be generated once on install and may be updated periodically to make sure that a third-party hacker with an old certificate cannot attempt to decipher media packets at some point later. Once generated, the calling endpoint 205 can send the media tunneling offer to the SBC 210. For example, the calling endpoint 205 can send the new SDP offer to the SBC 210 in a SIP re-INVITE via SIP signaling channel 235 or HTTP message via HTTP signaling channel 230.

The SBC 210 can receive the media tunneling offer from the calling endpoint 205 and generate a media tunneling answer in response to the media tunneling offer from the calling endpoint 205. The media tunneling answer can comprise a representation of a certificate for the SBC and an indication of a port of the session border controller 210. For example, when the SDP offer is received by the SBC 210, the SBC 210 acting as a TLS/UDP media gateway, can generate an SDP answer that includes TCP/TLS as the media transport mechanism and the fingerprint of the SBC's 210 self-signed certificate. Knowing that the media tunneling offer from the calling endpoint 205 is coming from to the external network, the SBC 210 can put into the SDP answer its HTTPs listener socket address (e.g., the listener socket connected port 443). Once generated, the SBC 210 can send the media tunneling answer to the calling endpoint 205. For example, the SDP answer can be sent by the SBC 205 towards the calling endpoint in a SIP 200 OK response via SIP signaling channel 235 or an HTTP message via HTTP signaling channel 230.

The calling endpoint 205 can receive, in response to the media tunneling offer, the media tunneling answer and determine, based on the media tunneling answer, whether media tunneling is available. For example, the calling endpoint 205 can detect that media tunneling is supported based on the presence of TLS based transport indicated in the SDP answer message. If media tunneling is not supported, the outgoing call attempt can fail. In response to determining media tunneling is available, the calling endpoint 205 can generate a media tunneling setup message including the representation of the certificate for the endpoint and sending the media tunneling setup message to the port of the session border controller 210 indicated by the media tunneling answer. For example, the calling endpoint 205 can initiate an outbound TLS connection using the IP address provided for audio and video transport in the SDP answer provided by the SBC 210.

According to one embodiment, audio and video packets can be carried over separate socket connections 240 and 245 to minimize the impact of video packets on audio latency and quality during congestion and impairment conditions. The RTP and RTCP packets for audio and video channels 240 and 245 can be separately multiplexed in order to halve the number of TLS socket connections that need to be setup. That is, the audio RTP and RTCP packets can be multiplexed over one TLS connection, where the video RTP and RTCP packets can be multiplexed over a second TLS connection towards the SBC. It is also possible that other media channels 240 and 245, such as presentation video or BFCP control channels, can be negotiated through this mechanism. Audio video packets can be multiplexed into a single TLS socket connection. However, doing so can impair audio quality as audio and video packets are channeled over the same pipeline/socket connection and transmission of large video packets can create additional audio delays. Accordingly, the audio and video channels can be kept separate for this reason. In this case, each media channel 240 and 245 (audio, people video, presentation video, or BFCP control session) can have its own separate TLS connection over which RTP and RTCP packets can be multiplexed. Embodiments of this disclosure do not prevent multiple video streams to be bundled together into the same TLS socket, as done for the webRTC client today. Rather, such bundling can be complementary to the approach described herein.

The SBC 210 can receive, at the port indicated by the media tunneling answer, the media tunneling setup message from the calling endpoint 205 and determine whether the representation of the certificate from the media tunneling setup message and the representation of the certificate in the media tunneling offer match. As noted, each TLS socket connection set up by the calling endpoint 205 can use the self-signed certificate for which a fingerprint was provided in the SDP offer provided to the SBC 210. The SBC 210 can in turn perform mutual TLS authentication with the endpoint 205, to solicit the endpoint's 205 certificate used to secure a media connection. The certificate obtained from the endpoint 205, a self-signed certificate that can expire periodically, e.g., every few days, can be used by the SBC 210 to calculate a fingerprint for the certificate. This certificate fingerprint information can be compared against outstanding SDP offers for which there are no existing TLS socket connections. Therefore, the SBC 210 searches outstanding SDP offers to figure out if the fingerprint provided by the endpoint 205 matches the one received in an SDP offer.

If the SBC 210 cannot locate an outstanding SDP offer that has matching fingerprint information, it can reject the TLS socket connection attempt and the call attempt can fail. If a matching fingerprint is found, the media connection can be established. Thus, in response to determining the representation of the certificate from the media tunneling setup message matches the representation of the certificate in the media tunneling offer, one or more media channels 240 and 245 of the port of the session border controller 210 indicated by the media tunneling answer can be associated with the call session. In a typical audio+video call, the audio TLS connection and video TLS connection can use different TLS certificates. The reason for this is that the queuing and gatewaying characteristics of audio and video packets can be different. The SBC 210 can associate the tunneled media channels 240 and 245 to negotiated SDP media lines via the unique TLS fingerprint used for each tunneled media channel. Assuming the TLS fingerprint matches, the SBC 210 can then associate a call session at the signaling level with the TLS connection(s) setup for media channel(s) associated with the call session.

Once these associations have been made, call setup can be considered complete and media of the call session can be exchanged using the one or more media channels 240 and 245 of the session border associated with the call session and signaling of the call session using the signaling channel 230 and/or 235. For example, the calling endpoint can use RFC4571 to tunnel the media over TCP/TLS. According to one embodiment, RTP and RTCP exchanges can be multiplexed. During the exchanges, the SBC 210 can convert the tunneled media from the calling endpoint 205 over TCP/TLS to UDP, and the UDP media from the remote endpoint 225 of the call to TCP/TLS. According to one embodiment, SRTP can be used to encrypt media tunneled over TLS.

Figure 3:
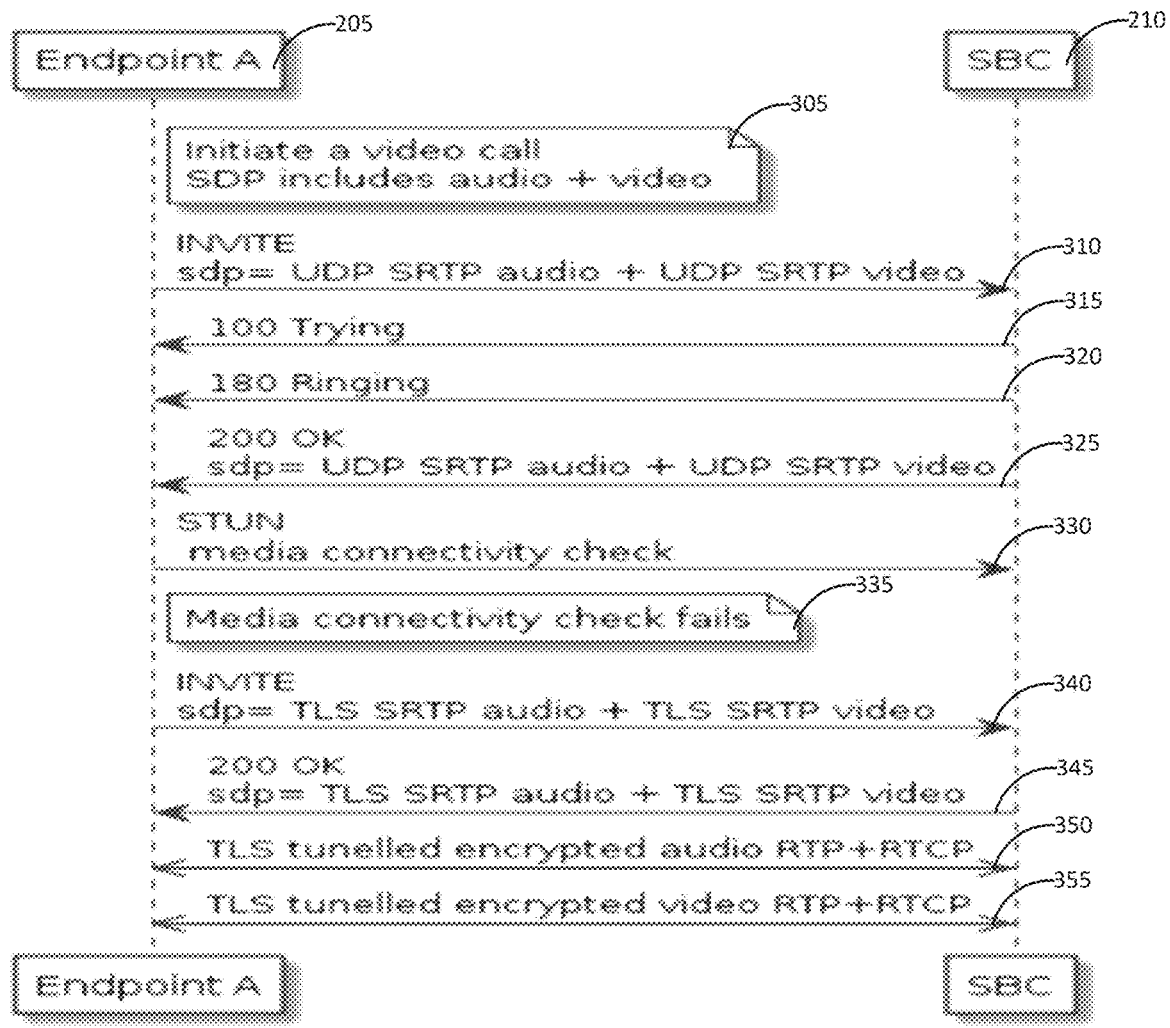
FIG. 3 is a diagram illustrating initiation of for media tunneling through an edge server according to one embodiment.

FIG. 3 is a diagram illustrating initiation of for media tunneling through an edge server according to one embodiment. As illustrated in this example, calling endpoint 205 can initiate 305 a video call by sending a signaling message requesting call setup such as a SIP INVITE message 310 to the SBC. The call setup signaling can include the calling endpoint's 205 media capabilities captured in a Session Description Protocol (SDP) message carried in the SIP INVITE request 310. According to one embodiment, the SDP message can include the calling endpoint's 205 local IP address, list of codecs the calling endpoint 205 prefers to use for an audio channel and video channel, audio and video port numbers that are used to send/receive audio and video RTP packets/respectively.

The SBC 210 can receive, from the calling endpoint 205, the message 310 requesting initiation of the call between the calling endpoint 205 and the remote endpoint and determining whether the call has been accepted by the remote endpoint. While attempting to connect with the remote endpoint, the SBC can respond the calling endpoint 205 with SIP 100 Trying and 180 Ringing messages 315 and 320 as appropriate. If the call set up request is not accepted by the remote endpoint, the call can fail. In response to determining the call has been accepted by the remote endpoint, the SBC 210 can send a response to the calling endpoint 205 indicating acceptance of the call. For example, if the call set up request is accepted by the remote endpoint, a SIP 200 OK response 325 carrying the remote endpoint's SDP media capabilities can be returned to the calling endpoint 205 from the SBC 210. This information returned to the calling endpoint 205 can include the remote endpoint's media address, ports (audio and video), audio and video codecs, etc.

The calling endpoint 205 can receive the SIP 200 OK response 325 from the SBC 210 and, still during initiation of the call session with the remote endpoint, send a STUN message 330 over audio channel or video channel, to make sure that UDP based RTP audio and video packets can be exchanged with the remote endpoint. The SBC 210 can receive the STUN message 330 and determine, based on the message from the calling endpoint 205, whether media connectivity is available between the calling endpoint 205 and the remote endpoint. If the STUN connectivity check fails 335, the calling endpoint 205 can initiate a media tunneling based negotiation by sending the new SDP offer to the SBC 210 in a SIP re-INVITE 340 via SIP signaling channel or HTTP message via HTTP signaling channel.

The SBC 210 can receive the SIP re-INVITE 340 from the calling endpoint 205 and generate a media tunneling answer in response to the media tunneling offer from the calling endpoint 205. The media tunneling answer can comprise a representation of a certificate for the SBC and an indication of a port of the session border controller 210. For example, when the SDP offer is received by the SBC 210, the SBC 210 acting as a TLS/UDP media gateway, can generate an SDP answer that includes TCP/TLS as the media transport mechanism and the fingerprint of the SBC's 210 self-signed certificate. Knowing that the media tunneling offer from the calling endpoint 205 is coming from to the external network, the SBC 210 can put into the SDP answer its HTTPs listener socket address (e.g., the listener socket connected port 443). Once generated, the SBC 210 can send the media tunneling answer to the calling endpoint in a SIP 200 OK response 345.

The calling endpoint 205 can receive the SIP 200 OK response 345 and initiate outbound TLS connections using the IP address provided for audio and video transport in the SIP 200 OK response 345. As described above, audio and video packets can be exchanged 350 and 355 over separate socket connections to minimize the impact of video packets on audio latency and quality during congestion and impairment conditions. The RTP and RTCP packets for audio and video channels can be separately multiplexed in order to halve the number of TLS socket connections that need to be setup. That is, the audio RTP and RTCP packets can be multiplexed over one TLS connection, where the video RTP and RTCP packets can be multiplexed over a second TLS connection towards the SBC.

Figure 4:
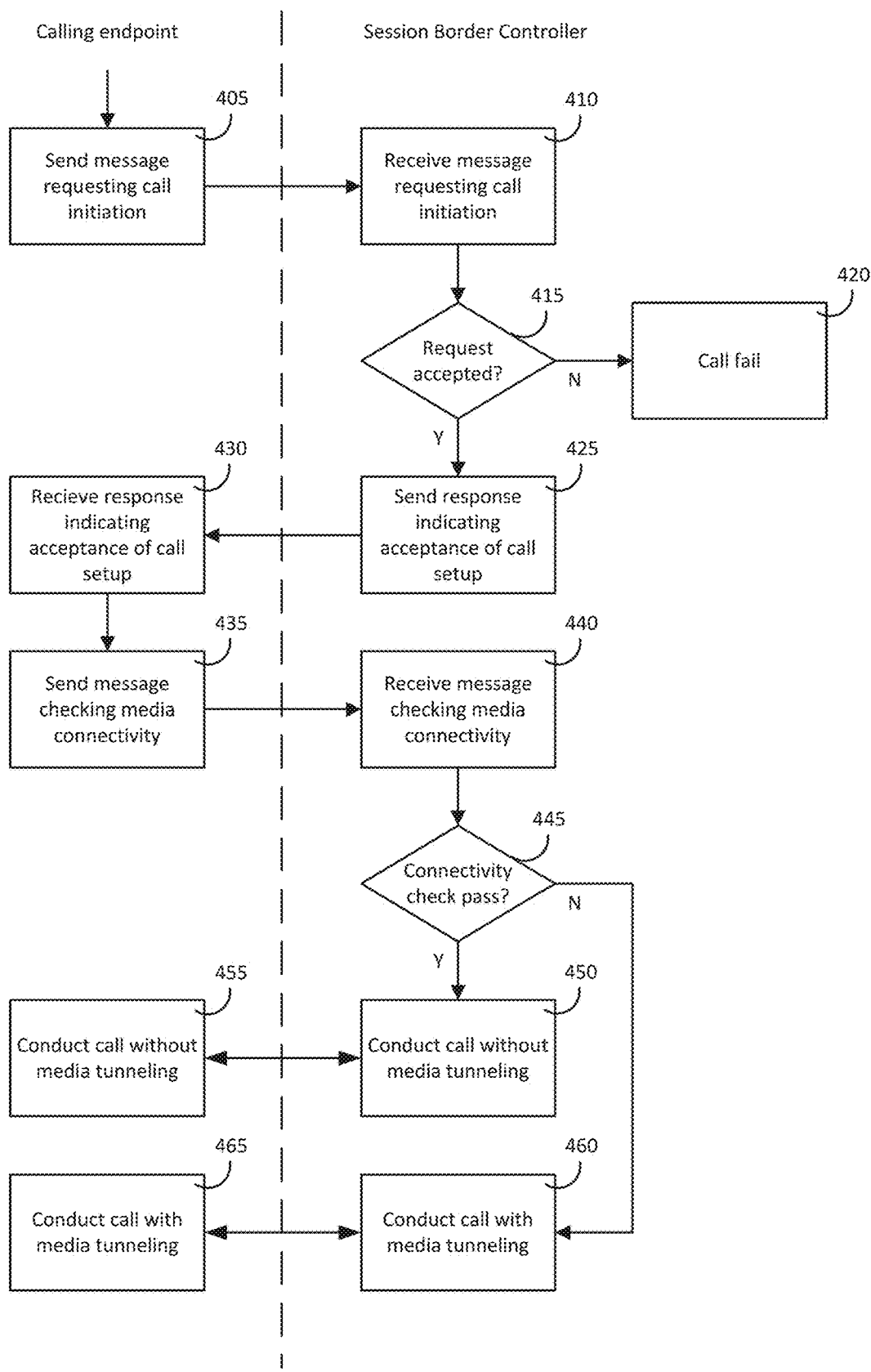
FIG. 4 is a flowchart illustrating an exemplary process for exchanging media across communication networks according to one embodiment.

FIG. 4 is a flowchart illustrating an exemplary process for exchanging media across communication networks according to one embodiment. As illustrated in this example, exchanging media can begin with the calling endpoint sending 405 a message requesting call initiation. For example, the external, calling endpoint can send 405 a signaling message such as a SIP INVITE message or an HTTP-based message requesting call setup. The call setup signaling can include the calling endpoint's media capabilities captured in a Session Description Protocol (SDP) message carried in the call set up message (e.g., in the SIP INVITE request). According to one embodiment, the SDP message can include the calling endpoint's local IP address, list of codecs the calling endpoint prefers to use for audio and video channels, audio and video port numbers that are used to send/receive audio and video RTP packets, respectively.

The SBC can receive 410, from the calling endpoint, the message requesting initiation of the call between the calling endpoint and the remote endpoint and determining 415 whether the call has been accepted by the remote endpoint. If 415 the call set up request is not accepted by the remote endpoint, the call can fail 420. In response to determining 415 the call has been accepted by the remote endpoint, the SBC can send 425 a response to the calling endpoint indicating acceptance of the call. For example, if 415 the call set up request is accepted by the remote endpoint, a SIP 200 OK response (or an HTTP message) carrying the remote endpoint's SDP media capabilities can be returned to the calling endpoint from the SBC. This information returned to the calling endpoint can include the remote endpoint's media address, ports (audio and video), audio and video codecs, etc.

The calling endpoint can receive 430 the response from the SBC and, still during initiation of the call session with the remote endpoint on the second communication network, send 435 a message to the remote endpoint using a signaling channel to check media connectivity in the call session. For example, the calling endpoint can send 435 a STUN message over audio and video channels, to make sure that UDP based RTP audio and video packets can be exchanged with the remote endpoint. According to one embodiment, UDP-based media exchange can be considered the default way of exchanging media over TLS based media exchange and TLS-based media exchange can be used when UDP based media is unavailable or not supported due to firewall or other restrictions imposed between the calling endpoint and the remote endpoint.

The SBC can receive 440 the message to check media connectivity in the call session from the calling endpoint and determine 445, based on the message from the calling endpoint, whether media connectivity is available between the calling endpoint and the remote endpoint. In response to determining 445 media connectivity is available between the calling endpoint and the remote endpoint, the endpoints and SBC can conduct 450 and 455 the call session between the calling endpoint and the remote endpoint using the signaling channel without media tunneling. For example, if the STUN connectivity check passes, then the audio and video packets can be carried over UDP and no TLS based media tunneling is done. In response to determining 445 media connectivity is not available between the calling endpoint and the remote endpoint, the endpoints and SBC can conduct 460 and 465 the call session between the calling endpoint and the remote endpoint using the signaling channel and media tunneling. For example, if the STUN connectivity check fails, the calling endpoint can initiate a media tunneling based negotiation. Additional details of initiating and conducting media tunneling according to one embodiment will now be described with reference to FIG. 5.

Alternatively and according to one embodiment, at the point 445 where the media connectivity check fails, the calling endpoint can instruct the SBC, or another application server within the enterprise, to set up the media path to a separate telephone number. For example, the external endpoint (caller's endpoint) can initiate media connectivity, e.g., by sending the STUN packet. If the STUN packet exchange fails, the external endpoint can send a separate command that tells the SBC or another application running in the enterprise network to set up a second call to a specified telephone number, say (908) 848 5514. For example, this can be a PSTN number or a cellular number. The SBC or the separate application can then initiate a separate call towards the specified number associated with the caller. When the caller answers the incoming call on this new number, the SBC or the application server can complete the rest of the call. However, with this approach, video may not be supported and only the audio portion of the call may be to a call-me number. Therefore, this "call me" approach may be supported as a backup or failsafe to the media tunneling process.

Figure 5:
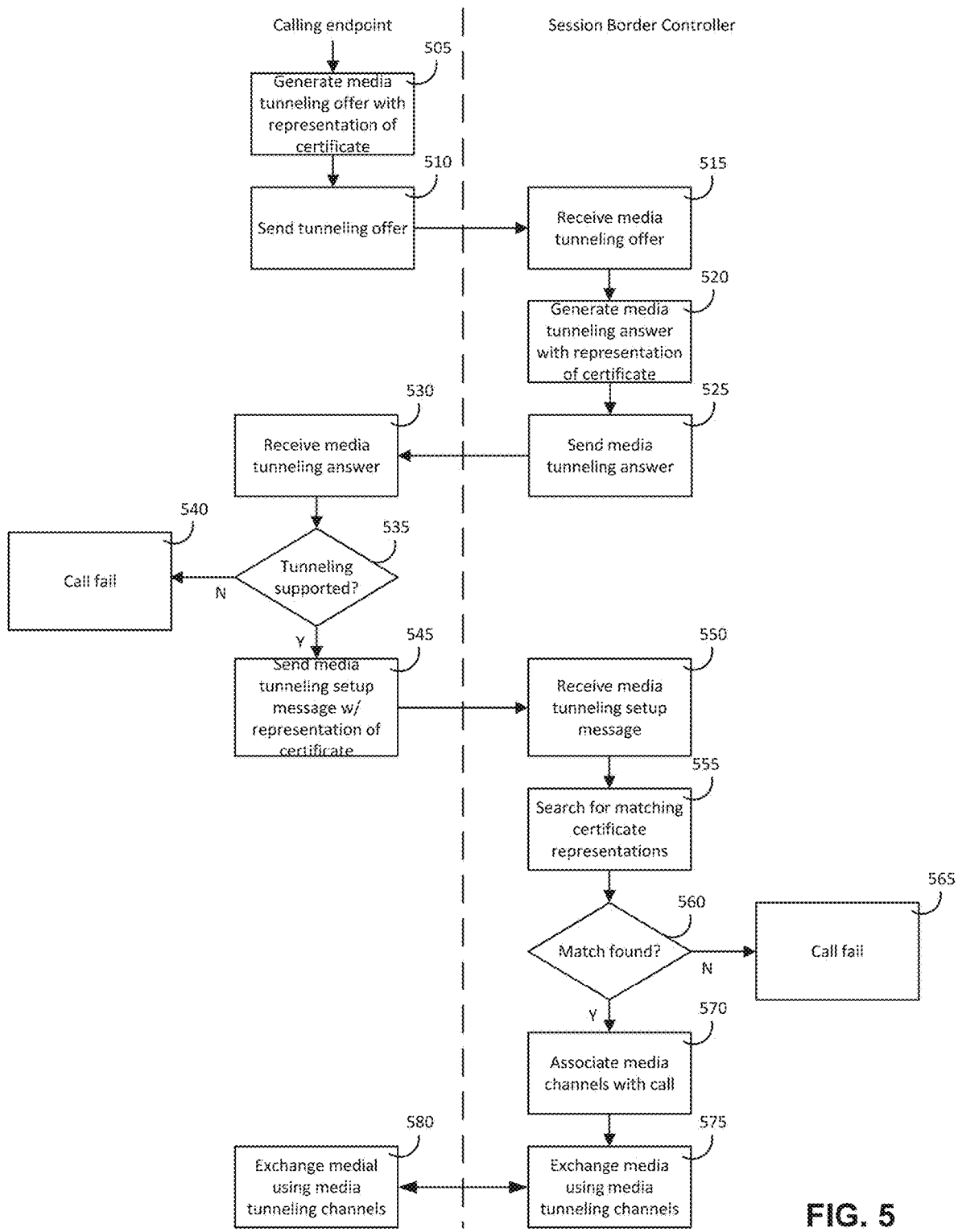
FIG. 5 is a flowchart illustrating additional details of an exemplary process for media tunneling according to one embodiment.

FIG. 5 is a flowchart illustrating additional details of an exemplary process for media tunneling according to one embodiment. As illustrated in this example, media tunneling can begin with the calling endpoint generating 505 a media tunneling offer. According to one embodiment, media tunneling can use a separate TCP/TLS connection on port 443 to utilize firewall pinholes opened for HTTP traffic instead of tunneling media over an HTTP session or a web socket session. Thus, the calling endpoint can initiate a new SDP offer with TCP/TLS RTP transport on each m-line instead of UDP RTP. According to one embodiment, the media tunneling offer can comprise a representation of certificate for the calling endpoint. For example, the SDP offer can contain a fingerprint of a self-signed locally generated certificate. The locally generated certificate can be generated once on install and may be updated periodically to make sure that a third-party hacker with an old certificate cannot attempt to decipher media packets at some point later. Once generated 505, the calling endpoint can send 510 the media tunneling offer to the SBC. For example, the calling endpoint can send 510 the new SDP offer in a SIP re-INVITE or HTTP message to the SBC.

The SBC can receive 515 the media tunneling offer from the calling endpoint and generate 520 a media tunneling answer in response to the media tunneling offer from the calling endpoint. The media tunneling answer can comprise a representation of a certificate for the SBC and an indication of a port of the session border controller. For example, when the SDP offer is received by the SBC, the SBC acting as a TLS/UDP media gateway, can generate an SDP answer that includes TCP/TLS as the media transport mechanism and the fingerprint of the SBC's self-signed certificate. Knowing that the media tunneling offer from the calling endpoint is corning from to the external network, the SBC can put into the SDP answer its HTTPs listener socket address (e.g., the listener socket connected port 443). Once generated 520, the SBC can send 525 the media tunneling answer to the calling endpoint. For example, the SDP answer can be sent 525 by the SBC towards the calling endpoint in a SIP 200 OK response or an HTTP message.

The calling endpoint can receive 530, in response to the media tunneling offer, the media tunneling answer and determine 535, based on the media tunneling answer, whether media tunneling is available. For example, the calling endpoint can detect that media tunneling is supported based on the presence of TLS based transport indicated in the SDP answer message. If 535 media tunneling is not supported, the outgoing call attempt can fail 540. In response to determining 535 media tunneling is available, the calling endpoint can generate 545 a media tunneling setup message including the representation of the certificate for the endpoint and sending the media tunneling setup message to the port of the session border controller indicated by the media tunneling answer. For example, the calling endpoint can initiate an outbound TLS connection using the IP address provided for audio and video transport in the SDP answer provided by the SBC.

According to one embodiment, audio and video packets can be carried over separate socket connections to minimize the impact of video packets on audio latency and quality during congestion and impairment conditions. The RTP and RTCP packets for audio and video channels can be separately multiplexed in order to halve the number of TLS socket connections that need to be setup. That is, the audio RTP and RTCP packets can be multiplexed over one TLS connection, where the video RTP and RTCP packets can be multiplexed over a second TLS connection towards the SBC. It is also possible that other media channels, such as presentation video or BFCP control channels, can be negotiated through this mechanism. In this case, each media channel (audio, people video, presentation video, or BFCP control session) can have its own separate TLS connection over which RTP and RTCP packets can be multiplexed. Embodiments of this disclosure do not prevent multiple video streams to be bundled together into the same TLS socket, as done for the webRTC client today. Rather, such bundling can be complementary to the approach described herein.

The SBC can receive 550, at the port indicated by the media tunneling answer, the media tunneling setup message from the calling endpoint and determine whether the representation of the certificate from the media tunneling setup message and the representation of the certificate in the media tunneling offer match. As noted, each TLS socket connection set up by the calling endpoint can use the self-signed certificate for which a fingerprint was provided in the SDP offer provided to the SBC. The SBC can in turn perform mutual TLS authentication with the endpoint, to solicit the endpoint's certificate used to secure a media connection. The certificate obtained from the endpoint, a self-signed certificate that can expire periodically, e.g., every few days, can be used by the SBC to calculate a fingerprint for the certificate. This certificate fingerprint information can be compared against outstanding SDP offers for which there are no existing TLS socket connections. Therefore, the SBC searches 555 outstanding SDP offers to figure out if the fingerprint provided by the endpoint matches the one received in an SDP offer.

If 560 the SBC cannot locate an outstanding SDP offer that has matching fingerprint information, it can reject the TLS socket connection attempt and the call attempt can fail 565. If 560 a matching fingerprint is found, the media connection can be established. Thus, in response to determining 560 the representation of the certificate from the media tunneling setup message matches the representation of the certificate in the media tunneling offer, one or more media channels of the port of the session border controller indicated by the media tunneling answer can be associated 570 with the call session. In a typical audio+video call, the audio TLS connection and video TLS connection can use different TLS certificates. Since audio and video packets are not multiplexed together to the same socket connection, to prevent quality degradation to audio packets, they will be transmitted over two separate socket connections. In order for each of the socket connections to be successfully identified at the SBC, each TLS based socket connection should be supported by a unique certificate. The reason for this is that the queuing and gatewaying characteristics of audio and video packets can be different. The SBC can associate 570 the tunneled media channels to negotiated SDP media lines via the unique TLS fingerprint used for each tunneled media channel. Assuming the TLS fingerprint matches, the SBC can then associate a call session at the signaling level with the TLS connection(s) setup for media channel(s) associated with the call session.

Once these associations have been made, call setup can be considered complete and media of the call session can be exchanged 575 and 580 using the one or more media channels of the session border associated with the call session and signaling of the call session using the signaling channel. For example, the calling endpoint can use RFC4571 to tunnel the media over TCP/TLS. According to one embodiment, RTP and RTCP exchanges can be multiplexed. During the exchanges, the SBC can convert the tunneled media from the calling endpoint over TCP/TLS to UDP, and the UDP media from the remote endpoint of the call to TCP/TLS. According to one embodiment, SRTP can be used to encrypt media tunneled over TLS.

It should be noted that, while the figures and accompanying description of each illustrate and describe the external endpoint initiating a call, the same media tunneling approach can be applied whether the external endpoint is the initiator of the call, or the receiver of the call. It should also be noted that it is possible for both caller and called endpoints to be on the external network. In this case, the SBC can provide media tunneling support to allow exchange of media between two external endpoints, which would otherwise have not been possible.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a session border controller coupled with a first communication network and a second communication network, the session border controller comprising a processor and a memory, the memory comprising a set of instructions stored therein which, when executed by the processor, causes the processor to:
receive, from a calling endpoint on the first communication network during initiation of a call session between the calling endpoint and a remote endpoint on the second communication network using a signaling channel, a message to the remote endpoint to check media connectivity in the call session;
determine, based on the message from the calling endpoint, whether media connectivity is available between the calling endpoint and the remote endpoint;
in response to determining media connectivity is available between the calling endpoint and the remote endpoint, conduct the call session between the calling endpoint and the remote endpoint using the signaling channel and without using a media tunnel; and in response to determining media connectivity is not available between the calling endpoint and the remote endpoint, conduct the call session between the calling endpoint and the remote endpoint using the signaling channel and the media tunnel, wherein conducting the call session between the calling endpoint and the remote endpoint using the signaling channel and the media tunnel comprises:

receiving a media tunneling offer from the calling endpoint, the media tunneling offer including a representation of a certificate for the calling endpoint;

generating a media tunneling answer in response to the media tunneling offer from the calling endpoint, the media tunneling answer comprising a representation of a certificate for the session border controller and an indication of a port of the session border controller;

sending the media tunneling answer to the calling endpoint;

receiving, at the port of the session border controller indicated by the media tunneling answer, a media tunneling setup message including a representation of a certificate;

determining whether the representation of the certificate from the media tunneling setup message and the representation of the certificate in the media tunneling offer match;

in response to determining that the representation of the certificate from the media tunneling setup message matches the representation of the certificate in the media tunneling offer, associating one or more media channels of the port of the session border controller indicated by the media tunneling answer with the call session; and exchanging media of the call session using the one or more media channels of the session border controller associated with the call session and signaling of the call session using the signaling channel.

2. The system of claim 1, wherein conducting the call session further comprises converting the media exchanged between the calling endpoint and the remote endpoint over the one or more media channels from a protocol of the first communication network to a protocol of the second communication network and from the protocol of the second communication network to the protocol of the first communication network.

3. The system of claim 2, wherein the one or more media channels comprise an audio channel and a video channel separate from the audio channel.

4. The system of claim 3, wherein signaling for the audio channel and the video channel is multiplexed and exchanged via the signaling channel.

5. The system of claim 1, wherein initiation of the call session further comprises:

receiving, from the calling endpoint, a message requesting initiation of a call between the calling endpoint and the remote endpoint;

determining whether the call has been accepted by the remote endpoint; and in response to determining the call has been accepted by the remote endpoint, sending a response to the calling endpoint indicating acceptance of the call.

6. A system comprising:

an endpoint coupled with a first communication network, the endpoint comprising a processor and a memory, the memory comprising a set of instructions stored therein which, when executed by the processor, causes the processor to:

send, during initiation of a call session with a remote endpoint on a second communication network using a signaling channel, a message to the remote endpoint to check media connectivity in the call session;

in response to determining that media connectivity is available with the remote endpoint, conduct the call session with the remote endpoint using the signaling channel and without using a media tunnel; and in response to determining that media connectivity is not available with the remote endpoint, conduct the call session with the remote endpoint using the signaling channel and the media tunnel, wherein conducting the call session between the endpoint and the remote endpoint using the signaling channel and the media tunnel comprises:

receiving a media tunneling offer from the endpoint, the media tunneling offer including a representation of a certificate for the endpoint;

generating a media tunneling answer in response to the media tunneling offer from the endpoint, the media tunneling answer comprising a representation of a certificate for a session border controller and an indication of a port of the session border controller;

sending the media tunneling answer to the endpoint;

receiving, at the port of the session border controller indicated by the media tunneling answer, a media tunneling setup message including a representation of a certificate;

determining whether the representation of the certificate from the media tunneling setup message and the representation of the certificate in the media tunneling offer match;

in response to determining that the representation of the certificate from the media tunneling setup message matches the representation of the certificate in the media tunneling offer, associating one or more media channels of the port of the session border controller indicated by the media tunneling answer with the call session; and exchanging media of the call session using the one or more media channels of the session border controller associated with the call session and signaling of the call session using the signaling channel.

7. The system of claim 6, wherein the one or more media channels comprise an audio channel and a video channel separate from the audio channel.

8. The system of claim 7, wherein signaling for the audio channel and the video channel is multiplexed and exchanged via the signaling channel.

9. The system of claim 6, wherein initiation of the call session further comprises sending, to the remote endpoint, a signaling message requesting call session initiation.

10. A method comprising:

receiving, at a session border controller from a calling endpoint on a first communication network during initiation of a call session between the calling endpoint and a remote endpoint on a second communication network using a signaling channel, a message to the remote endpoint to check media connectivity in the call session;

determining, by the session border controller based on the message from the calling endpoint, whether media connectivity is available between the calling endpoint and the session border controller;

in response to determining that media connectivity is available between the calling endpoint and the session border controller, conducting, by the session border controller, the call session between the calling endpoint and the remote endpoint using the signaling channel and without using a media tunnel; and in response to determining that media connectivity is not available between the calling endpoint and the session border controller, conducting, by the session border controller, the call session between the calling endpoint and the remote endpoint using the signaling channel and the media tunnel, wherein conducting the call session between the calling endpoint and the remote endpoint using the signaling channel and the media tunnel further comprises:

receiving a media tunneling offer from the calling endpoint, the media tunneling offer including a representation of a certificate for the calling endpoint;

generating a media tunneling answer in response to the media tunneling offer from the calling endpoint, the media tunneling answer comprising a representation of a certificate for the session border controller and an indication of a port of the session border controller;

sending the media tunneling answer to the calling endpoint;

receiving, at the port of the session border controller indicated by the media tunneling answer, a media tunneling setup message including a representation of a certificate;

determining whether the representation of the certificate from the media tunneling setup message and the representation of the certificate in the media tunneling offer match;

in response to determining that the representation of the certificate from the media tunneling setup message matches the representation of the certificate in the media tunneling offer, associating one or more media channels of the port of the session border controller indicated by the media tunneling answer with the call session; and exchanging media of the call session using the one or more media channels of the session border controller associated with the call session and signaling of the call session using the signaling channel.

11. The method of claim 10, wherein conducting the call session further comprises converting the media exchanged between the calling endpoint and the remote endpoint over the one or more media channels from a protocol of the first communication network to a protocol of the second communication network and from the protocol of the second communication network to the protocol of the first communication network.

12. The method of claim 10, wherein the one or more media channels comprise an audio channel and a video channel separate from the audio channel.

13. The method of claim 12, wherein signaling for the audio channel and the video channel is multiplexed and exchanged via the signaling channel.

* * * * *